US010321661B2

(12) United States Patent
Kath

(10) Patent No.: US 10,321,661 B2
(45) Date of Patent: Jun. 18, 2019

(54) PERSONAL DOG CARRIER HARNESS SYSTEM WITH INTEGRATED INTERNAL SUPPORT AND PADDED NECK SUPPORT

(71) Applicant: Liy Kath, San Francisco, CA (US)

(72) Inventor: Liy Kath, San Francisco, CA (US)

(*) Notice: Subject to any disclaimer, the term of this patent is extended or adjusted under 35 U.S.C. 154(b) by 269 days.

(21) Appl. No.: 15/359,768

(22) Filed: Nov. 23, 2016

(65) Prior Publication Data
US 2018/0139921 A1 May 24, 2018

(51) Int. Cl.
*A01K 1/02* (2006.01)
*A01K 27/00* (2006.01)
A47D 13/02 (2006.01)

(52) U.S. Cl.
CPC ............ *A01K 1/029* (2013.01); *A01K 1/0263* (2013.01); *A01K 27/003* (2013.01); *A47D 13/025* (2013.01)

(58) Field of Classification Search
CPC ..... A01K 1/029; A01K 1/0263; A47D 13/025
See application file for complete search history.

(56) References Cited

U.S. PATENT DOCUMENTS

| | | | |
|---|---|---|---|
| 4,492,326 A * | 1/1985 | Storm | A47D 13/025 224/159 |
| D293,139 S | 12/1987 | Roa | |
| 5,176,102 A * | 1/1993 | Tracy | A01K 1/0254 119/497 |
| 5,277,148 A * | 1/1994 | Rossignol | A01K 1/029 119/453 |
| 5,570,823 A * | 11/1996 | Lindy | A47D 13/025 224/159 |
| D429,390 S | 8/2000 | Grady et al. | |
| 6,619,519 B1 * | 9/2003 | Nix | A45C 7/0086 224/153 |
| 7,296,303 B1 * | 11/2007 | Samet | A01K 1/029 119/496 |

(Continued)

FOREIGN PATENT DOCUMENTS

CN 203493023 * 3/2014 ............... A45F 3/04

*Primary Examiner* — Christopher R Harmon
(74) *Attorney, Agent, or Firm* — Jonathan Sip

(57) ABSTRACT

A personal dog carrier harness system for supporting and carrying a dog at the owner's chest or back. The dog carrier harness utilizes a vertical adjustment mechanism to adapt to shorter or longer dog neck sizes. A double-layer zipper prevents the dog's hair or skin from getting caught in the carrier harness system. Full internal support with stretchability is provided to support the dog's rear end, tail, and hind limbs with increased room to accommodate the male dog's crotch area and anatomy. Access points are ruggedized to allow the dog to easily remove and insert their arms and legs during travel in the carrier harness. Fully breathable materials are used in the construction for the comfort of the pet dog. A chin rest neck support is provided to evenly distribute the dog's weight with a pillow-like design for the dog's full neck support. A safety leash and clip is provided to securely attach to the dog's collar or existing harness to prevent the dog from jumping or falling out of the harness system. The dog carrier system is worn by the owner with shoulder straps and pads, waist straps and full lumbar support for even weight distribution and to prevent movement of the dog carrier system while the owner is in motion and during bending over.

17 Claims, 12 Drawing Sheets

(56) References Cited

U.S. PATENT DOCUMENTS

| | | | |
|---|---|---|---|
| D571,058 S | 6/2008 | Grooms | |
| 8,171,891 B2 | 5/2012 | Rubinstein et al. | |
| D681,287 S | 4/2013 | Collignon | |
| 8,607,740 B2 | 12/2013 | Webb | |
| 2002/0130148 A1* | 9/2002 | Le Gal | A47D 13/025 224/160 |
| 2008/0149673 A1* | 6/2008 | Slater | A01K 1/0254 224/153 |
| 2009/0071990 A1* | 3/2009 | Jardine | A45F 3/10 224/155 |
| 2012/0217273 A1* | 8/2012 | Gunter | A47D 13/025 224/160 |
| 2014/0060453 A1* | 3/2014 | Shewfelt | A01K 27/002 119/770 |
| 2014/0131401 A1* | 5/2014 | Workman | A47D 13/025 224/160 |
| 2015/0053735 A1* | 2/2015 | Murdoch | A45F 3/005 224/640 |
| 2017/0318865 A1* | 11/2017 | Karnati | A47D 13/02 |

* cited by examiner

PERSONAL DOG CARRIER HARNESS SYSTEM WITH INTEGRATED INTERNAL SUPPORT AND PADDED NECK SUPPORT

BACKGROUND

A personal dog carrier harness system is described here for safely, securely and comfortably carrying a pet dog at the owner's chest or back. The personal dog carrier harness system utilizes a front opening vertical adjustment mechanism for providing adjustability to comfortably secure various sized dogs, depending on whether the dog has a shorter or longer neck, the harness provides adjustability and allows the dog more visibility. A double-layer zipper mechanism is provided with flaps over the side zippers to eliminate the catching of the dog's hair or skin in the harness system and protect the dog from injury. A softly padded internal support seat with stretch-ability is provided to comfortably support the dog's hind limbs and crotch areas. Additional stretch-ability and roominess is provided at the crotch area for the male dog's anatomy. The dog's legs and arms are provided with rigid, padded rounded access or entry points so that the dog may easily insert and remove their limbs without being caught in the harness. The dog carrier harness system is constructed with breathable and mesh-like materials to provide the dog with a comfortable fit as well as soft padding for the dog's support. The dog carrier harness is also washable. A chin rest is provided for neck support and comfort of the dog while resting the dog's chin, neck or head upon the top of the dog carrier harness which allows for even weight distribution. The chin rest neck support is constructed with a pillow-like padded design for full neck support and for the dog's comfort.

A pocket space is provided to accommodate dog treats or the owner's personal belongings, such as keys, cellphone, or wallet. Additionally, a safety leash clip and strap mechanism is provided to attach to the dog's existing collar or other harness worn by the dog and secure the dog inside the harness system. The safety leash prevents the dog from jumping or falling out of the harness system. Furthermore, the dog carrier harness system is provided with fully-adjustable padded shoulder straps, waist straps, and lumbar support straps for full back support and even weight distribution on the owner's shoulders and body while carrying a dog. Full lumbar support for the dog owner is provided with the dog carrier system straps and webbing to securely support the dog while the owner is in motion, during bending over and other movement. The personal dog carrier system is reversible where it may be worn with the dog supported on the owner's chest, or alternatively reversed and worn backward with the dog supported on the owner's back. The carrier harness straps may be crossed at the owner's chest while the dog is supported on the owner's back or alternatively the straps may be crossed at the owner's back while the dog is supported at the owner's chest.

SUMMARY

The dog harness system disclosed here is embodied in a backpack-style system for holding small (3-8 lbs.) or medium (8-13 lbs.) sized dogs. A preferred embodiment of the presently described harness system is the "YAP SAK" designed and manufactured by YAP USA, Inc. The backpack style harness system is worn by the dog owner around the shoulders and waist and provides a harness mechanism for holding a small or medium sized dog at the owner's chest or the owner's back. The usefulness of a backpack-style harness system is realized when the owner wishes their dog to accompany them during outdoor activities such as biking, traveling in crowded areas, using public transportation, or even during extreme sports such as parachute jumping or paragliding. The harness presently disclosed utilizes a vertical adjustment system for adapting to taller or shorter dogs and dogs of various sizes in order to properly adjust the harness straps to accommodate the dog's neck and provide the dog with visibility. Another important feature of the harness system is a double-layer zipper mechanism for the side entry points for the dog on both the left and right sides of the harness. The double-layer zipper configuration prevents the dog's hair or skin from getting caught inside the zipper. An additional feature of the harness system is an ergonomically designed seat or internal support mechanism with stretch-ability for the dog's pelvis, crotch, rear-end and hind limbs. Added roominess and stretch-ability is provided at the crotch for the male dog's anatomy.

An important feature of the personal dog harness system described here is the provision of rounded and stiff corners at the openings and around the circumference of the front and rear limb entry and exit points. The stiff ledge at the opening allows the dog to pull in and take out their limbs without getting caught in the harness webbing or cover. Additionally, the harness webbing and support materials are fully breathable with the use of mesh materials. The harness system is washable. Another important feature of the harness system is the chin rest neck support mechanism. The chin rest neck support protects the dog's chin and neck when the dog rests on the harness top. The chin rest neck support provides for even weight distribution and acts as a pillow support structure for the dog. The chin rest neck support furthermore provides fully padded neck support and eliminates discomfort for the dog. The inside of the harness may be covered with a honeycomb or other compressible fabric structure for a secure and comfortable swaddle fit for the dog. In securing the backpack-style dog harness system to the owner, there is provided waist support, shoulder support and shoulder pads, and full lumbar support in order to evenly distribute and secure weight. Especially important is the full lumbar support provided that will act to prevent the dog harness from moving around when the owner bends over. A pocket may be provided on the lumbar support webbing for the owner's personal belongings. The presently disclosed harness system may be worn reversibly and the owner's dog may reside in the front on the owner's chest or alternatively on the owner's back. The harness system has been designed to be independently adjustable so that the owner does not require the assistance of others when putting on and taking off the harness.

DETAILED DESCRIPTION

The present invention relates to a personal dog carrier harness system with integrated internal support and padded neck support for transporting a pet dog safely and comfortably at the owner's chest or back. The design is intended to ensure that the dog owner and the pet dog feel maximum safety, security and comfort. The pet dog may be secured at the owner's chest or at the owner's back. The interior construction of the harness system is soft and padded to comfortably secure the animal. An important safety feature of the harness system is the double-layer zipper mechanism at each side, on the left side entry and at the right side entry. The double-layer zipper mechanism is designed with flaps over the side zippers to protect the dog from injury and eliminate the dog's hair or skin from getting caught in the zipper mechanism. An additional important feature of the harness system is the innovative ergonomically designed internal support seat with stretch-ability to comfortably support the dog's crotch area, hind limbs and rear end and tail. Additional stretch-ability and roominess is provided in the internal support seat at the crotch area for the male dog's anatomy.

The harness system may be constructed with a variety of materials and fabrics. The interior of the harness system may be constructed with a soft compressible polyester fleece padding material for soft padding on the interior surfaces for the dog's comfort. Canvas fabric material may be used on the exterior of the harness system for strength and durability. The harness system shoulder pads and pocket pouch may also be constructed out of a canvas material. A nylon mesh fabric material may be used on the harness system to provide breathability and airflow for the dog's comfort. The breathable mesh may surround the front middle, left side, and right side of the harness system for airflow around the dog's body. Leather may be used on various parts of the harness system and straps for strength and support. The zipper mechanisms on the left and right sides of the harness system may be fabricated with a metallic steel construction. The buckles on the harness system straps may be constructed of a nylon plastic material. The buttons on the front top opening of the harness system may be constructed with steel buttons. The shoulder, lumbar and waist support straps may be constructed with a nylon webbing material for maximum strength and durability.

Figure 1:
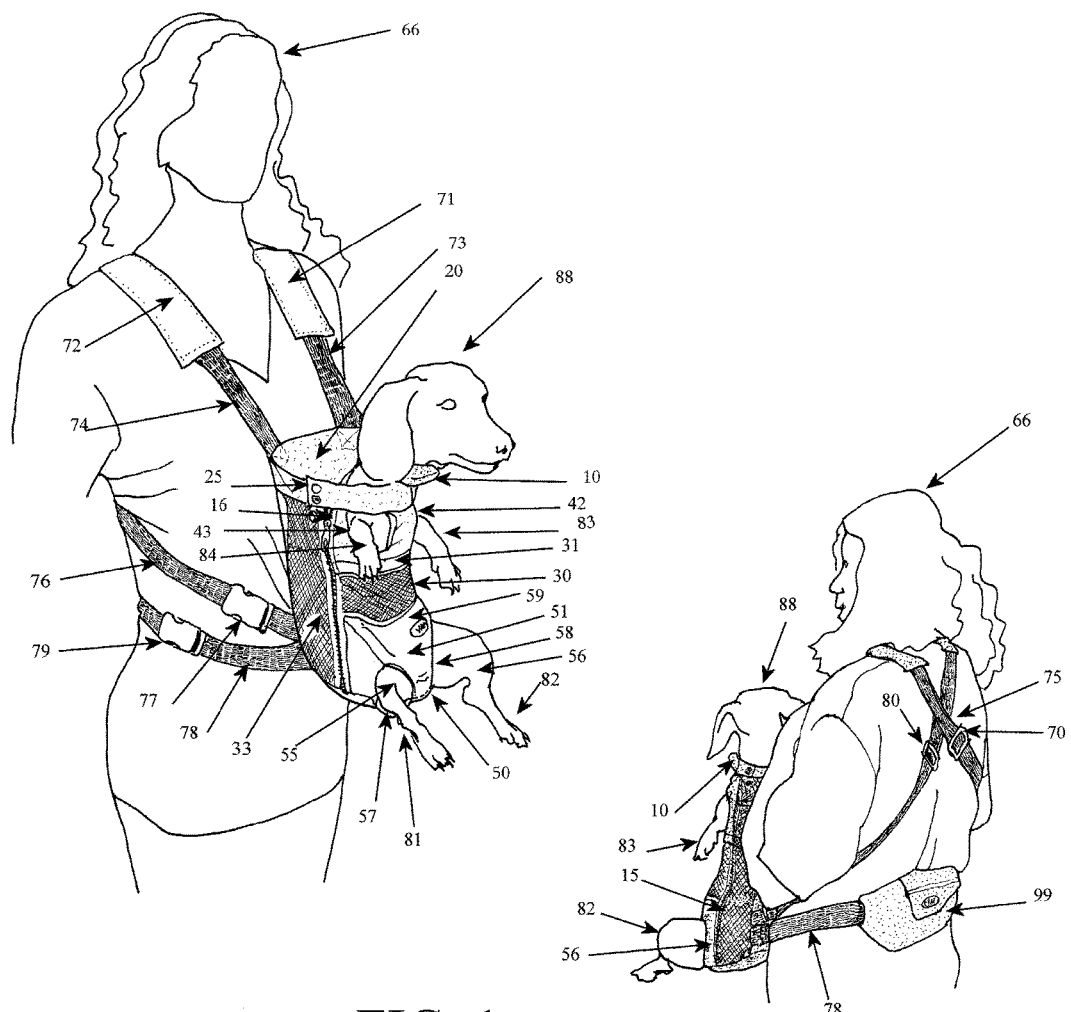
FIG. 1 is a view of the personal dog carrier harness system with integrated internal support and padded neck support being worn by the dog owner with a dog comfortably secured inside the harness system at the dog owner's chest.

FIG. 1 is a drawing of the personal dog carrier harness system with integrated internal support and padded neck support being worn by the dog owner 66 with a dog 88 comfortably secured inside the harness system at the dog owner's chest. The harness system utilizes a front opening 20 for access and a vertical adjustment mechanism 25 to comfortably secure various sized dogs depending on whether the dog's neck is shorter or longer. For example, a Pug has a shorter neck while a Greyhound has a taller neck, the harness vertical adjustment mechanism provides proper fitment at the top of the harness to the dog's neck and provides the dog with visibility. A double-layer zipper mechanism 16 is provided at the right side to allow access. The double-layer zipper 16 has flaps to protect the dog from injury and eliminate the catching of hair or skin in the zipper. A chin rest neck support 10 is provided with a padded pillow-like design for the comfort of the dog. The chin rest neck support 10 allows the dog to rest their chin, neck and head at the top of the harness system for even weight distribution. The internal support seat feature 59 provides support and even weight distribution for the dog's rear end, tail, hind limbs 81, 82, and crotch areas 50. Additional stretch-ability and roominess is provided in the internal support seat at the crotch area 51 for the male dog's anatomy. The dog's arms 83, 84 are allowed access points or openings at the top 42 and 43 of the harness. Similarly, the dog's hind limbs or legs 81, 82 are allowed openings at the bottom of the harness at 55 and 56. The openings at for the dog's legs 81, 82 and arms 83, 84 are designed with rigid, padded rounded edges at 57, 58, 42, and 43 so that the dog may easily and comfortably push out and pull in their arms and legs without interference from the harness. For airflow, a breathable mesh material 30 is provided at the middle section of the harness system. Additional breathable mesh material is provided on the sides of the harness at 33. For the owner's safety and the dog's safety, a reflector stripe is provided on the harness system at 31.

The dog carrier harness system is provided with padded shoulder straps 71, 71 and nylon webbing material 73, 74 for maximum strength, durability and weight distribution for the dog owner. The shoulder strap webbing 76 connects to the dog harness system with a nylon plastic clip at 77. The padded shoulder straps 71, 72 loop over the owner's shoulders and may cross at the back 75 and be further adjusted with nylon plastic clips 70 and 80. The padded shoulder straps 71, 72 may comprise a rubberized, non-slip surface at the contact points with the owner's shoulders to eliminate slipping and movement of the shoulder straps during use. The waist strap webbing 78 loops around the owner's waist and connects to the harness system with a nylon clip at 79. A pocket pouch 99 is provided with padding for full lumbar support of the dog carrier harness system and to support the load during bending over and other movement. Personal items such as dog treats, keys, wallet and cellphone may be stored in the pocket pouch 99. The pocket pouch 99 is attached and integrated into the carrier harness system waist strap webbing 78.

Figure 2:
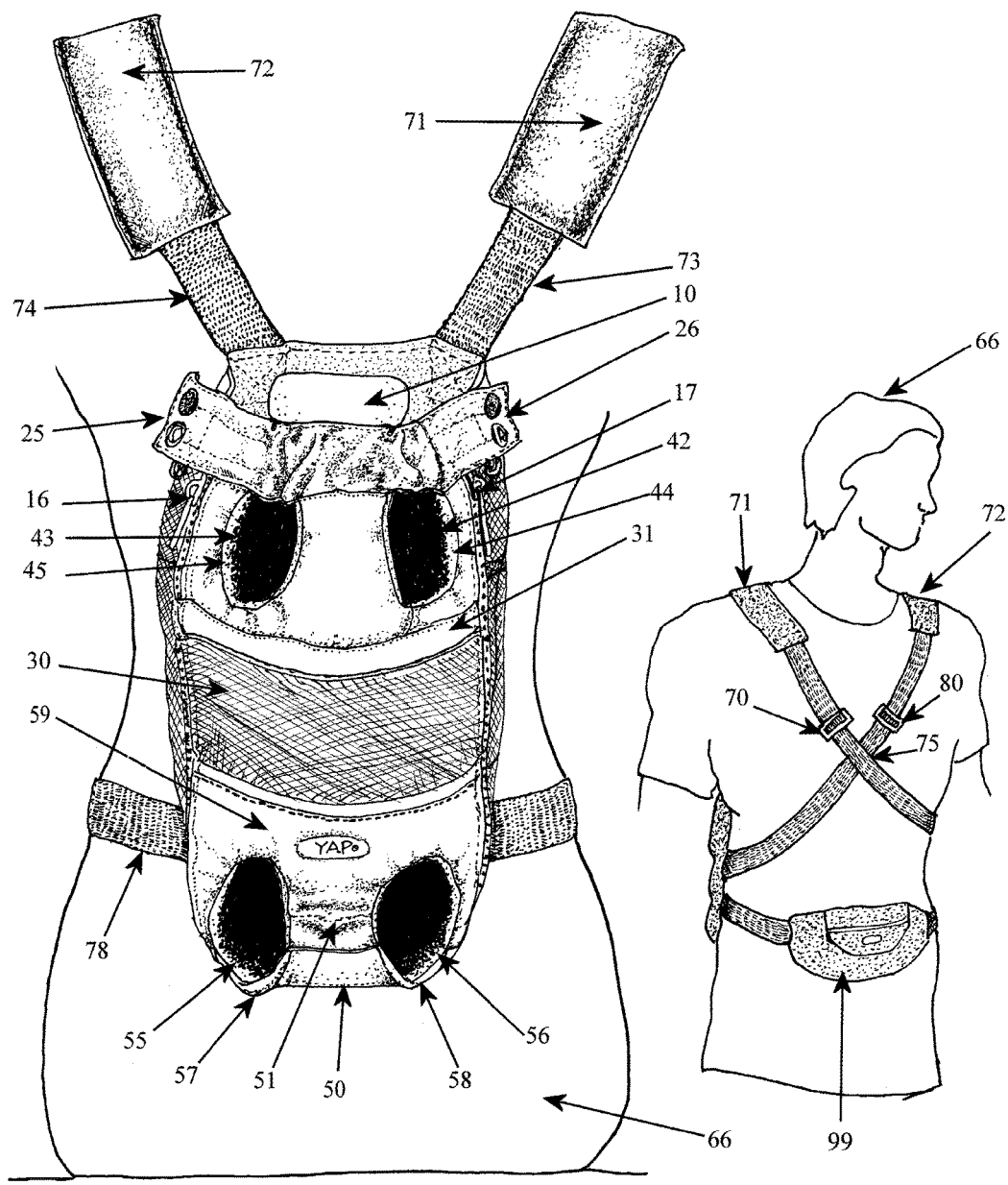
FIG. 2 is a detailed close-up view of the personal dog carrier harness system with integrated internal support and padded neck support being worn on the dog owner's back.

FIG. 2 is a detailed close-up view of the personal dog carrier harness system with integrated internal support and padded neck support being worn on the dog owner's back 66. The padded shoulder straps are shown at 72, 71 for even weight distribution on the owner's body. Nylon strap webbing 73, 74 connect the shoulder straps 71, 72 to the personal dog carrier harness system. A chin rest neck support pillow structure 10 is provided to give the dog full neck support and comfort. The front opening vertical adjustment mechanism is adjustable at 25 and 26 with straps, buttons or hook and loop fastener to comfortably secure various sized dogs. A double-layer zipper mechanism 16, 17 is provided on the right and left sides of the harness system for access. The double-layer zippers 16, 17 are designed with flaps over the side to protect the dog from injury and eliminate the catching of hair or skin in the zipper mechanisms. The dog's front legs or arms may be accessed and allowed to sit outside the harness via entry holes at 43 and 42. The dog may push out and pull in their arms with ease and comfort as the rounded edges 45, 44 at the entry holes 43, 42 are constructed with a stiff material for ease of exit and entry. A breathable mesh material is provided at 30 in the middle section of the harness system for airflow and comfort of the dog. A reflective stripe is provided at 31 for safety during nighttime. The internal support seat 59 is integrated into the bottom section of the harness. The "YAP" logo is clearly visible in the center of the integrated internal support seat 59 so that dog owners are aware that the personal dog carrier harness system is a genuine YAP SAK designed and manufactured by YAP USA, Inc. with the distinctive integrated internal support and padded neck support for safely, securely, and comfortably carrying a pet dog at the owner's chest or back. The internal support seat 59 is provided with stretch-ability and roominess for a dog's crotch area 50 and a male dog's anatomy. The lining of the internal support seat 59 may be constructed with a soft compressible polyester fleece padding material for soft padding on the interior surfaces for the dog's comfort. Support for the dog's hind limbs end exit points are provided at 55 and 56. The dog may push out and pull in their hind limbs or legs with ease and comfort as the rounded edges 57, 58 at the entry holes 55, 56 are constructed with a stiff material for ease of exit and entry. Nylon webbing straps 78 support the harness at the owner's back and lumbar areas. The padded shoulder straps 71, 72 may be crossed at the owner's chest 75 and adjustable with clips at 70 and 80. Alternatively, the shoulder straps 71, 72 may be worn straight like regular backpack straps (i.e., not crossed) depending on the owner's personal preference and comfort. The pocket pouch 99 is supported in front at the owner's stomach for personal items, dog treats, keys, wallet or cellphone.

Figure 3:
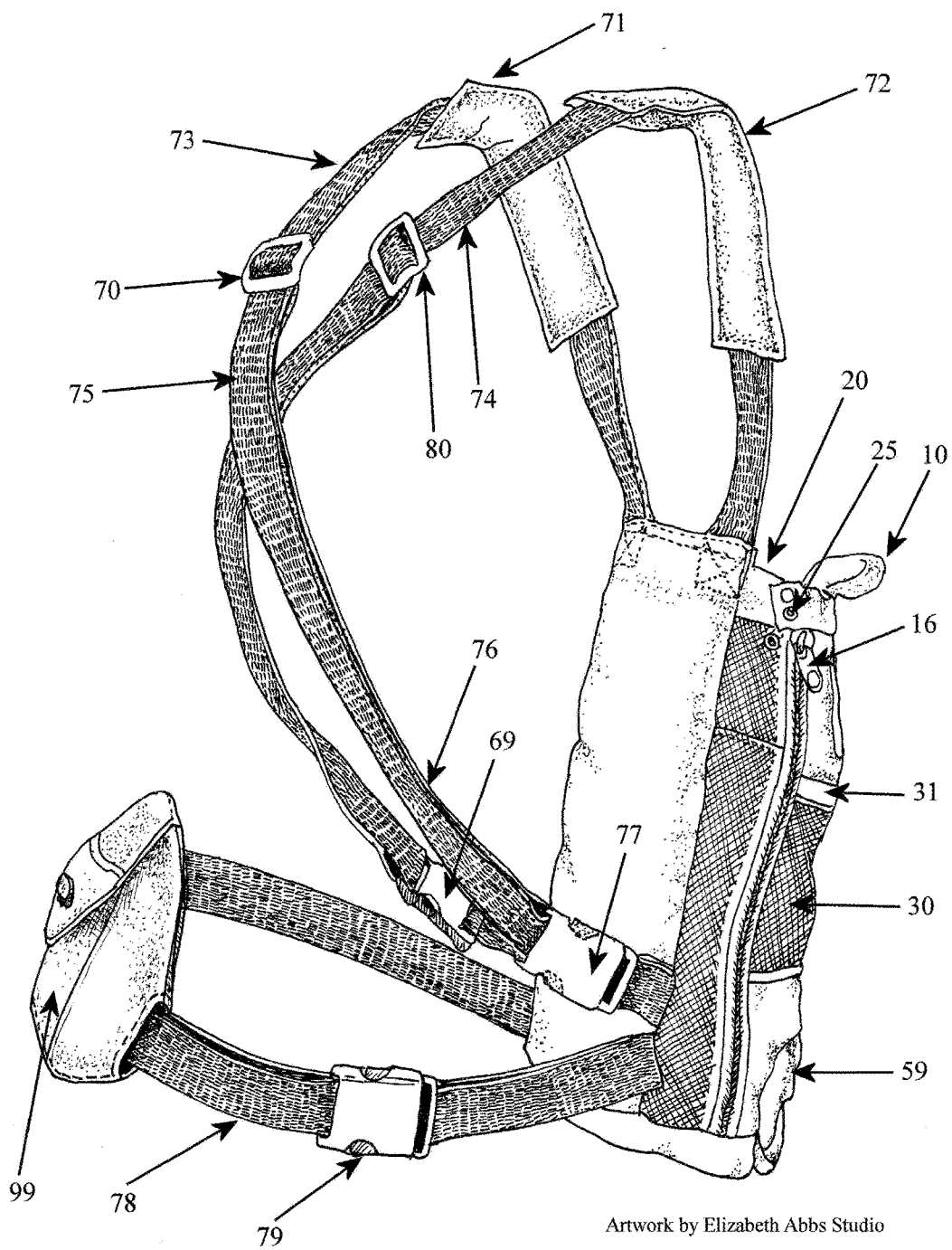
FIG. 3 is a detailed view of the personal dog carrier harness system with integrated internal support and padded neck support.

FIG. 3 is a detailed view of the personal dog carrier harness system with integrated internal support and padded neck support. The nylon webbing straps 73, 74 are integrated with the padded shoulder straps 71, 72 for weight distribution and support at the owner's shoulders during use. The nylon webbing straps 73, 74 may be crossed to the plastic connecting clips at 77, 69 and fully adjustable with clips 70, 80. The waist strap 78 is a nylon webbing strap for lumbar support and integrates a pocket pouch 99 for padded lumbar support and for holding personal items. The nylon waist strap is connected and adjusted across the waist with a nylon clip 79. There are eight (8) points of weight distribution in the harness system, i.e., (1) the top left side shoulder strap webbing 71 connection point at the harness system front or top opening 20; (2) the top right side shoulder strap webbing 72 connection point at the harness system front or top opening 20; (3) the bottom left side shoulder strap webbing 69 connection point at the harness system bottom section; (4) the bottom right side shoulder strap webbing 77 connection point at the harness system bottom section; (5) the left side connection point for the waist and lumbar support webbing 78; (6) the right side connection point for the waist and lumbar support webbing 78; (7) the integrated internal support seat 59; and (8) the padded chin rest neck support 10. These eight (8) points of weight distribution fully support and evenly distribute the dog's weight comfortably and securely on the dog owner. The carrier harness system provides a front opening 20 for access. The front opening vertical adjustment mechanism is adjustable to fit various sized dogs with a strap and button system 25. The dog's neck and chin are fully supported at the pillow-like padded structure 10. The double-layer zipper mechanism 16 allows side access and comes with flaps over the side zipper to protect the dog from injury and eliminate the catching of hair or skin in the zipper. The reflective stripe 31 is added across the front middle section of the harness above the breathable mesh 30 for airflow. The internal support seat 59 supports the dog's rear end, tail, hind limbs, and crotch area for even weigh distribution inside the harness system. Additional room is provided at the crotch area in the internal support seat 59 for the male dog's anatomy.

Figure 4:
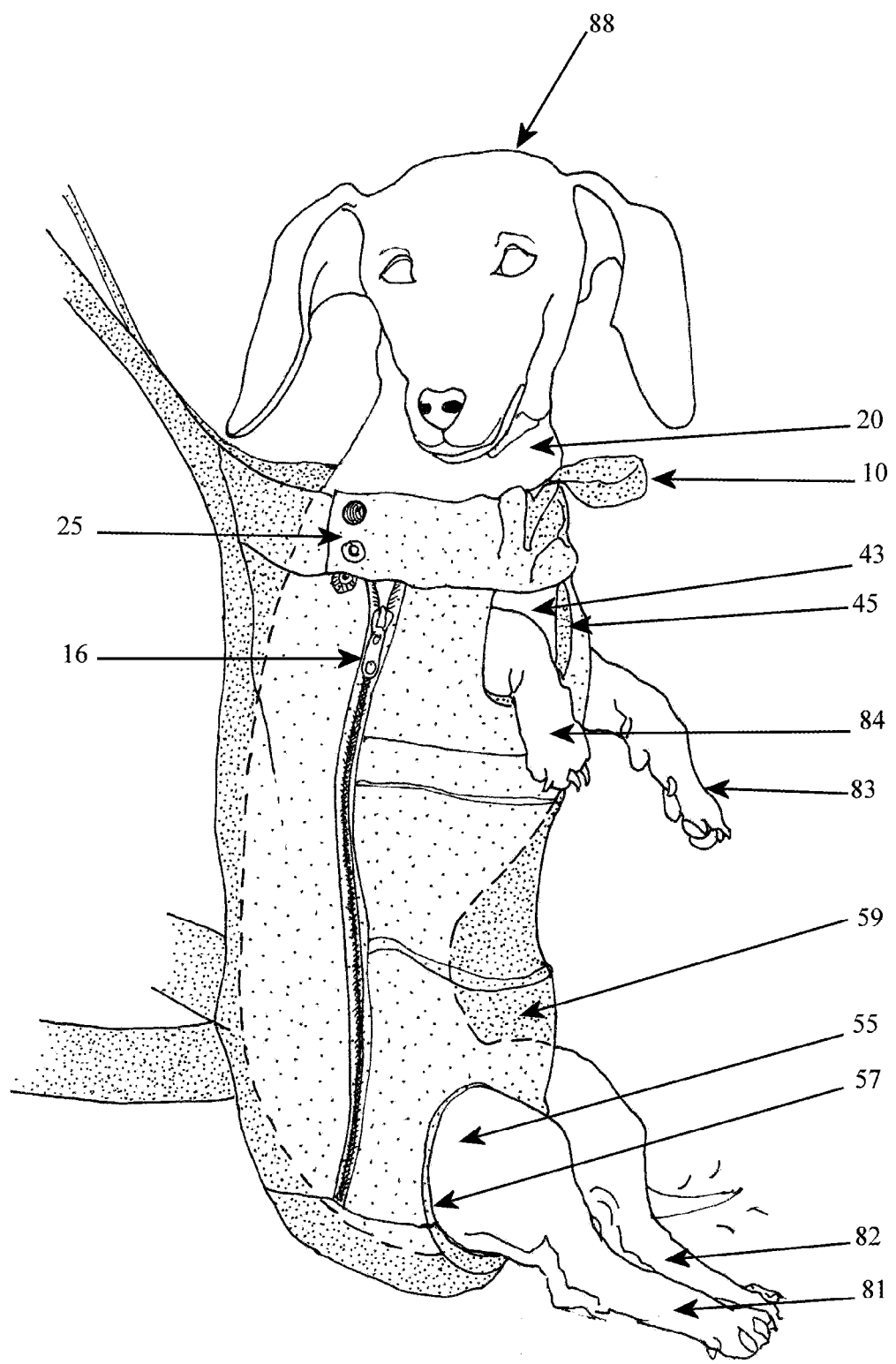
FIG. 4 is a close-up view of the personal dog carrier harness system with integrated internal support and padded neck support with a dog comfortably secured inside the harness system.

FIG. 4 is a close-up view of the personal dog carrier harness system with integrated internal support 59 and padded neck support 10 with a dog 88 comfortably secured inside the harness system. The front opening 20 allows the dog's head and upper body with visibility and access during use. The chin rest neck support 10 is available for resting the dog's chin and neck and providing additional comfort and security. The front opening access area 20 is adjustable to the dog at the vertical adjustment mechanism 25 with elastic straps and metallic buttons and can be properly fitted to dogs with longer or shorter neck sizes. Hook and loop fastener is also available at the vertical adjustment mechanism 25 to accommodate various sized dogs. The double-layer zipper mechanism 16 provides side access and entry points to the harness system for the dog. The double-layer zipper 16 is constructed with flaps over the zippers to protect the dog from injury and eliminate the catching of hair or skin in the zipper 16. The dog's front limbs 83, 84 may exit the harness at the access points. The left side access point 43 is shown in FIG. 4. The dog's front limbs may be pushed out and pulled in with ease as the stiff, rigid, padded rounded edges 45 of the entry point 43 are designed to provide unrestricted movement into and out of the harness. The ergonomically designed integrated internal support seat 59 provides even weight distribution and support of the dog within the harness. FIG. 4 shows the dog 88 securely and comfortably supported inside the harness system at the integrated support seat area 59. The integrated support seat 59 is an important point of weight distribution of the harness system and the support seat serves to comfortably and securely support the dog's lower body weight. The dog's lower body, rear end, and crotch, and hind limbs are evenly and securely supported at the integrated support seat 59. Additional room and stretch-ability is provided at the crotch area to accommodate the male dog's anatomy. The ergonomic design of the internal support seat is specifically tailored to fit the unique anatomy of a small dog's lower body, rear end and hind limbs for comfort and security within the harness system. The dog's hind limbs 81, 82 exit the harness via the access holes at the internal support seat 59. The left side access hole 55 is provided with stiff, rigid, padded rounded edges 57 to provided unrestricted movement into and out of the harness for the dog's hind limbs 81, 82. The dog's tail may tuck around inside the internal support seat 59, or alternatively the tail may stick out a leg hole 55 depending on the comfort or preference of the dog.

Figure 5:
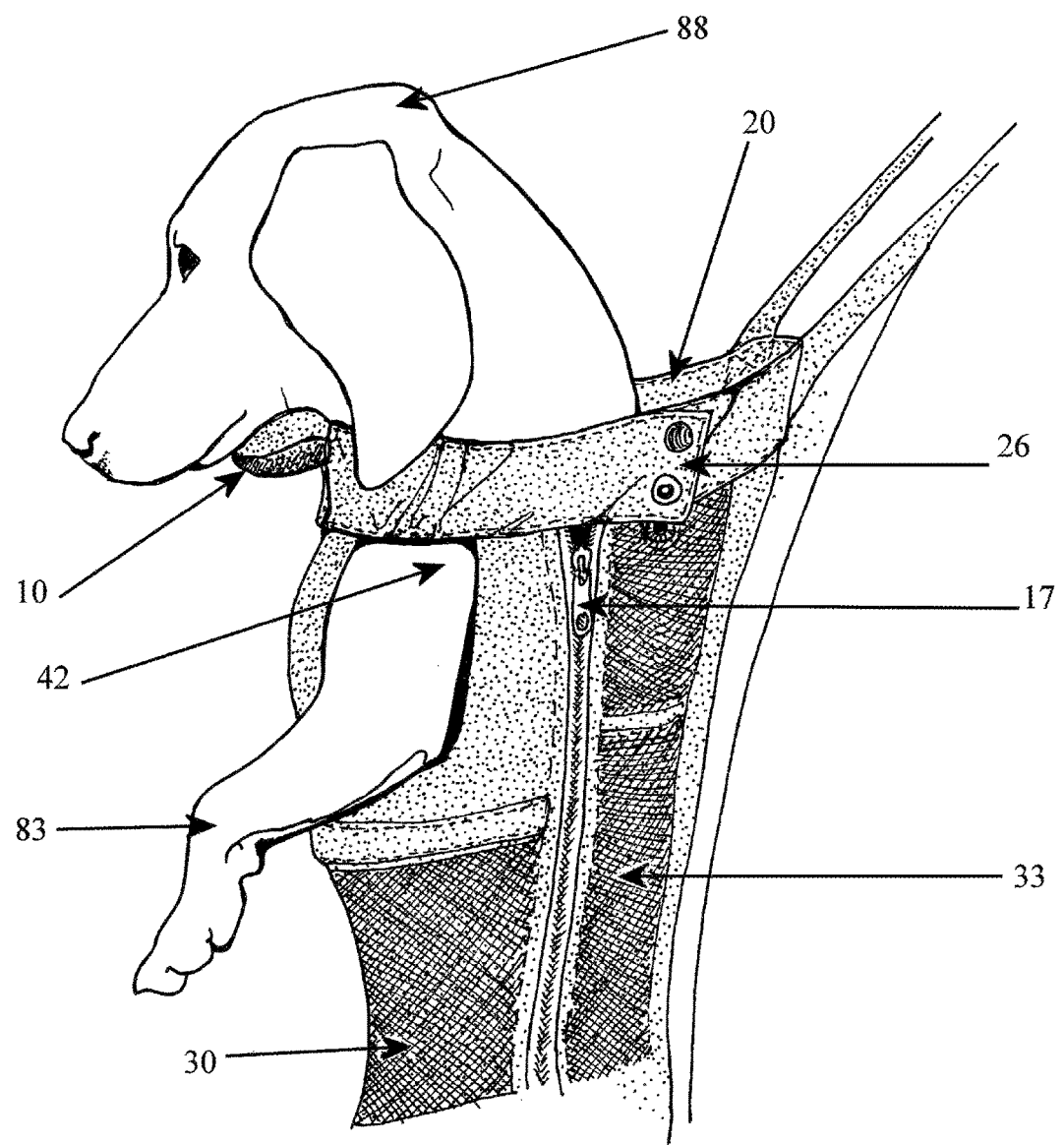
FIG. 5 is a detailed view of the padded chin and neck support of the personal dog carrier harness system with a dog's chin and head comfortably supported and secured inside the harness system.

FIG. 5 is a detailed view of the padded chin and neck support of the personal dog carrier harness system with a dog's chin and head comfortably supported and secured inside the harness system. The dog 88 is leaning forward in the harness system and the dog's chin and neck are fully supported at the padded chin and neck support 10. The padded chin rest neck support 10 is an important point of weight distribution of the harness system and serves to comfortably and securely support the dog's head and neck during use. The front opening access point 20 is provided at the top of the harness. The harness opening access point 20 is vertically adjustable with elastic straps and buttons 26 to accommodate dogs with longer or shorter neck sizes. The double-layer zipper mechanism 17 is provided on the side of the harness system for access and entry while placing the dog into and removing the dog from the harness. The double-layer zipper 17 is designed with flaps over the zippers to protect the dog from injury and to eliminate the catching of hair or skin in the zipper. Breathable mesh materials for airflow are provided at the front 30 and the sides 33 of the harness system. The dog's front limbs or arms 83 comfortably extend out of the harness via access point 42.

Figure 6:
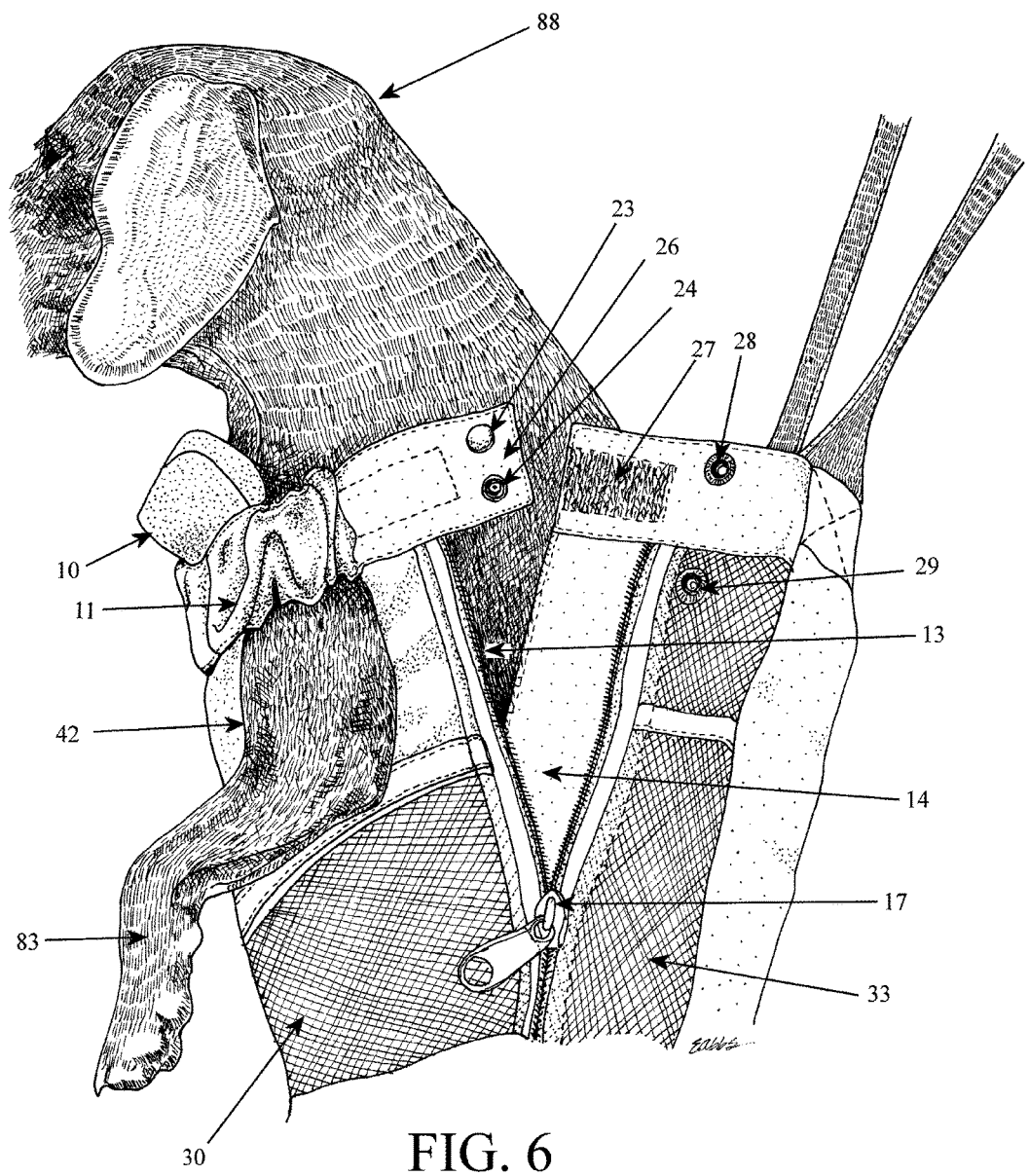
FIG. 6 is a close-up side view of the double-layer zipper mechanism of the personal dog carrier harness system with the dog's hair and skin being protected from the zipper mechanism.

FIG. 6 is close-up view of the double-layer zipper mechanism of the personal dog carrier harness system with the dog's hair and skin protected from the zipper mechanism with a flap 14 over the zipper 17. The flap 14 protects the dog from injury and eliminates the accidental catching of hair 13 or skin in the zipper 17. Vertical adjustability of the harness at the top front opening is provided via the elastic strap 11 and buttons 23, 24, 28, 29, and the strap closure 26 to the hook and loop fastener 27 side. For chin and full neck support the padded pillow support 10 is available to the dog 88. Breathable mesh materials 33, 30 provide airflow to the harness. The dog's front limbs 83 or arms are comfortably extended out of the harness via the access hole 42.

Figure 7:
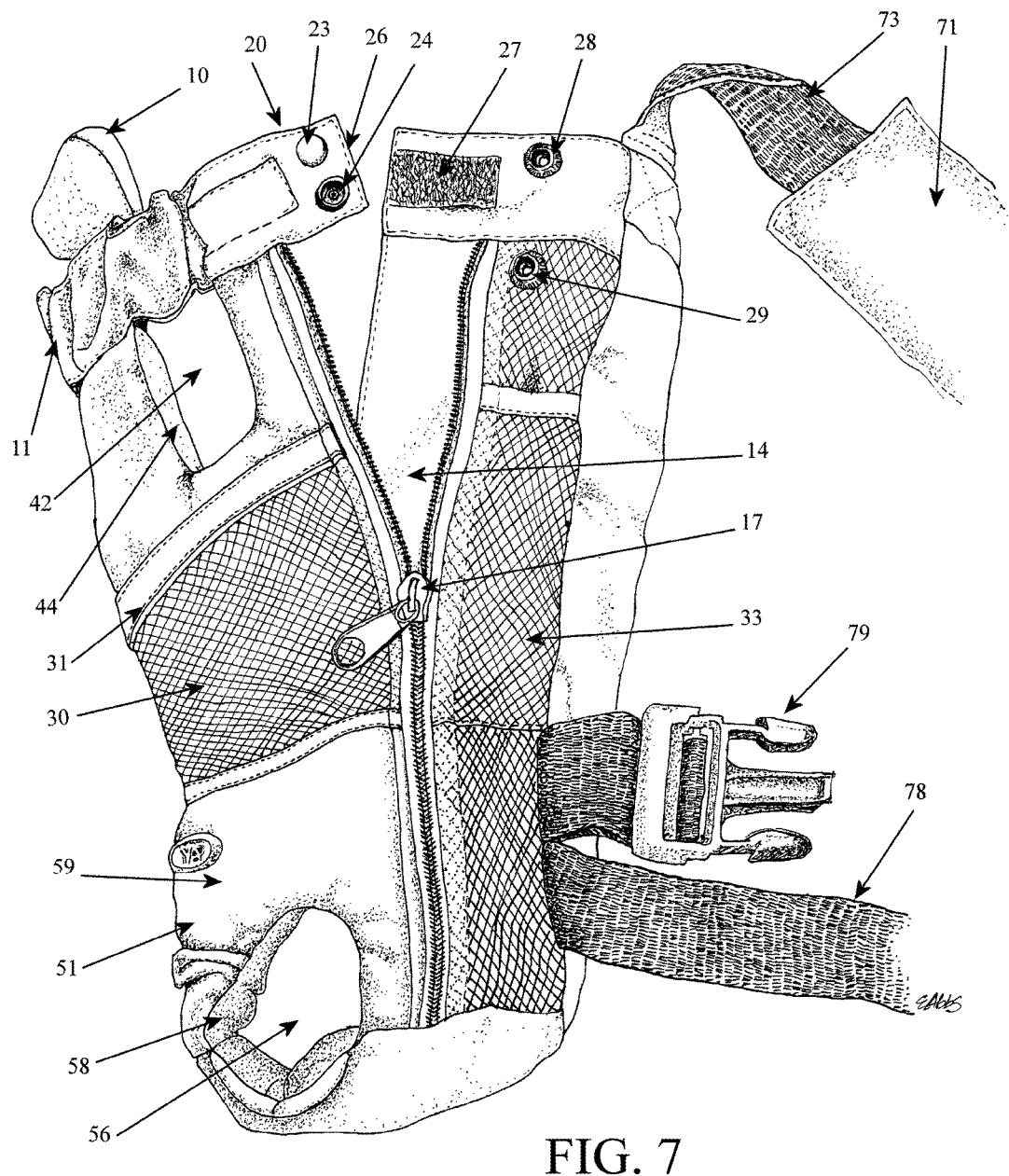
FIG. 7 is a close-up side view of the double-layer zipper mechanism of the personal dog carrier harness system and showing the integrated internal support and padded neck support.

FIG. 7 is a close-up side view of the double-layer zipper mechanism of the personal dog carrier harness system and shows the integrated internal support 59 and padded neck support 10. The double-layer zipper 17 is designed with a flap 14 to eliminate the accidental catching of the dog's hair or skin in the zipper 17. The top access point 20 is vertically adjustable with elastic 11 and buttons 23, 24, and 28, 29 and the strap 26 which connects with hook and loop fastener 27 to provide adjustability to secure a dog inside the harness system. The integrated internal support 59 provides full and even weight distribution for the dog's hind limbs, rear end, tail and crotch area. Additional room and stretch-ability is provided 51 for the male dog's anatomy. The dog's hind limbs are provided access holes 56 with stiff, rounded corners 58 to ensure unrestricted movement into and out of the harness. Similarly, the dog's arms may extend out through the access hole 42 and stiff, rounded corners 44 are provided to ensure unrestricted movement. Airflow and breathability for the dog are provided with mesh materials 30, 33. The harness system is secured to the dog owner with padded shoulder straps 73, 71 and a nylon webbing waist and lumber support strap 78. The waist and lumbar support strap 78 is secured to the harness system with a nylon clip 79.

Figure 8:
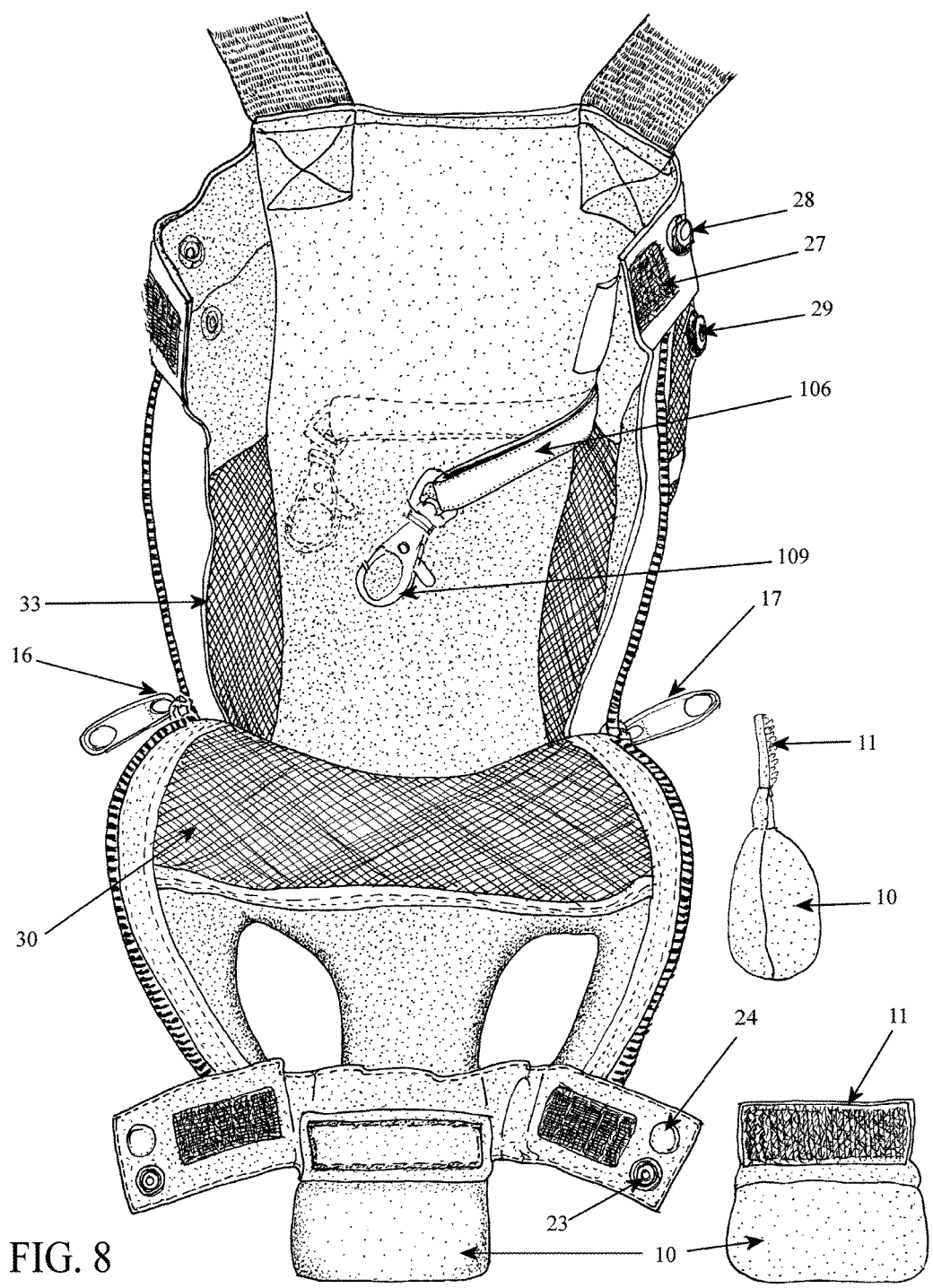
FIG. 8 is a detailed inside view of the personal dog carrier harness system showing the integrated clip and safety leash mechanism, detachable padded neck support, and double-layer zipper mechanism.

FIG. 8 is a detailed inside view of the personal dog carrier harness system showing the integrated safety leash 106 and clip mechanism 109, detachable padded neck support 10, and double-layer side zippers 16, 17. The safety leash 106 and clip 109 may be attached to the dog's collar in order to prevent the dog from jumping or falling out of the harness system. The chin rest neck support 10 is detachable from the harness system with integrated hook and loop fastener 11. The front opening access point of the harness system is vertically adjustable with buttons 23, 24, 28 and 29 as well as hook and loop fastener points 27 at the top strap. The harness system provides breathability and airflow with mesh material 30, 33.

Figure 9:
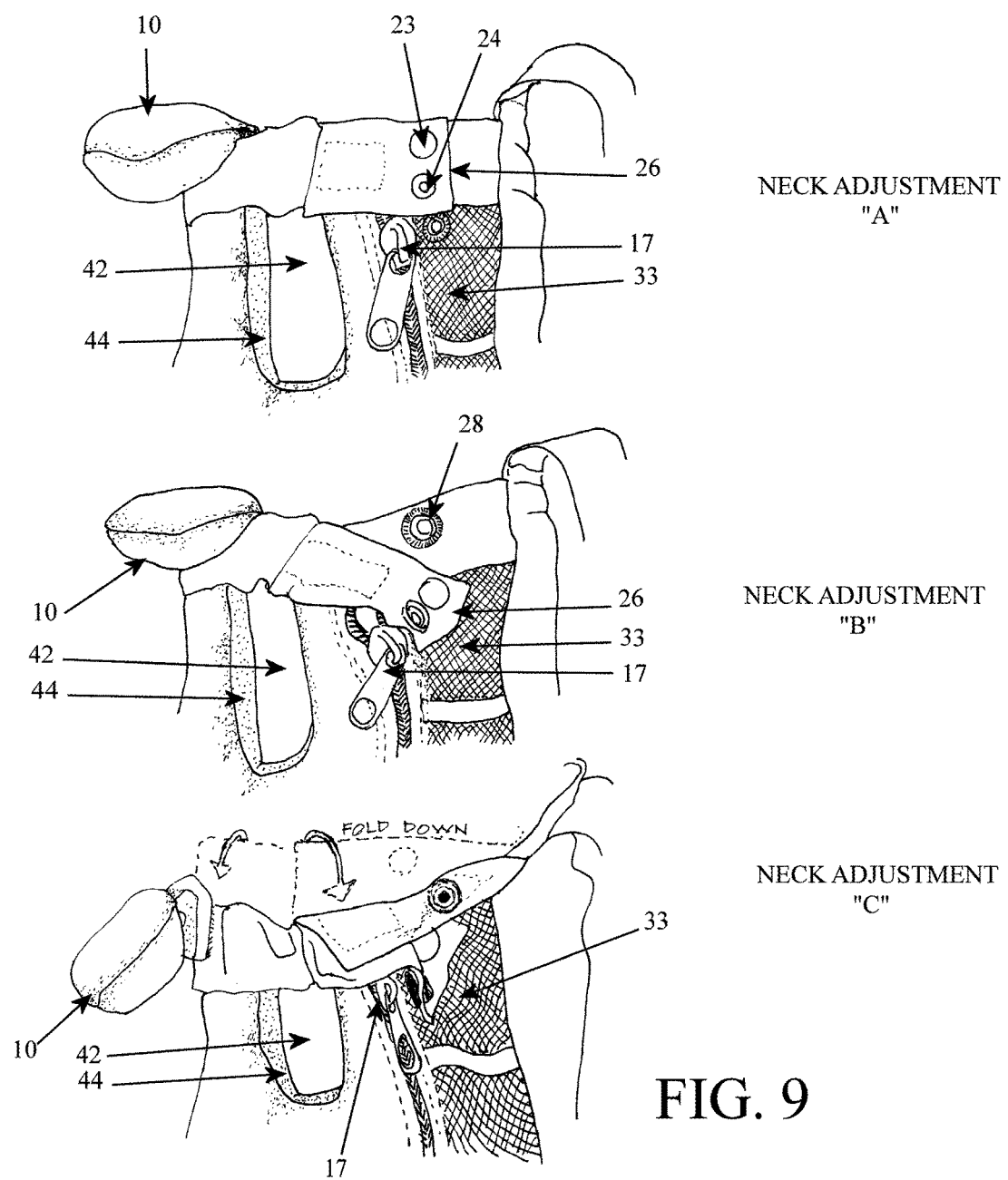
FIG. 9 is a detailed view of the front opening vertical adjustment mechanism and padded neck support and showing the three positions of adjustment as NECK ADJUSTMENT "A", "B", and "C" to accommodate dog's with shorter or longer neck lengths and provide the dog with more visibility.

FIG. 9 is a detailed view of the adjustable front opening top band vertical adjustment mechanism and padded neck support 10. The three positions of adjustment are shown in the drawing, i.e., NECK ADJUSTMENT "A", "B", and "C", for different sized dogs with varying neck sizes, back lengths, or breed of dog. The vertical adjustment mechanism allows the harness to adjust if the dog's neck is shorter or longer. In a preferred embodiment, the vertical adjustment mechanism allows up to 2½ inches of adjustment up or down. For example, the vertical adjustment mechanism may be made shorter and folded down in NECK ADJUSTMENT "C" for a dog with a shorter neck length such as the Pug breed. Alternatively, the vertical adjustment mechanism may be made longer at NECK ADJUSTMENT "A" for a dog with a longer neck length such as the Greyhound breed. Ultimately, the vertical adjustment mechanism provides the dog with a proper fitment at the top to the harness and allows the dog with more visibility. The top or front access point may be fully adjustable with the top strap 26 that utilizes elastic and hook and loop fastener as well as buttons 23, 24, 28. The top strap 26 may be folded down to accommodate various sized dogs. The double-layer zipper mechanism 17 allows access to the side entry points of the harness system. The dog's front limbs may extent out though the access point 42 and the stiff, rounded edges 44 allow unrestricted movement for the dog's limbs into and out of the harness system. Breathability and airflow are provided with the mesh material 33.

Figure 10:
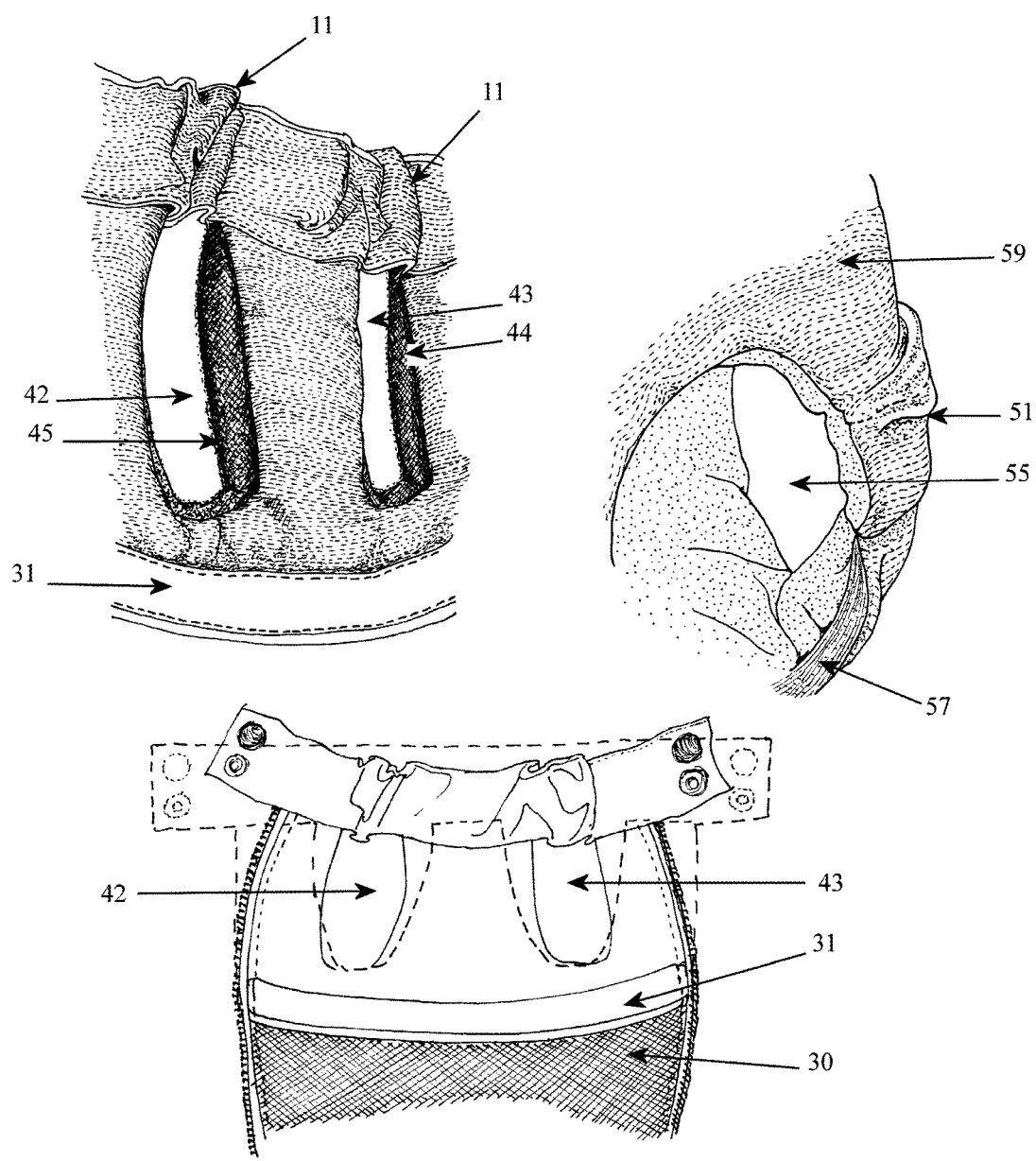
FIG. 10 provides detailed views of the front opening vertical adjustment mechanism and also a detailed side view of the integrated internal support.

FIG. 10 is a detailed view of the adjustable front opening mechanism and integrated internal support 59. Elastic adjustability 11 is provided for the top access point on the harness system. The dog's front limbs may extend out through the access points 42, 43 and stiff, rigid, padded rounded edges 45, 44 allow unrestricted movement into and out of the harness. For safety a reflective stripe 31 is provided on the front of the harness. The integrated internal support 59 is designed to provide even weight distribution and support for the dog's hind limbs, rear end, tail, and crotch area. Additional room 51 and stretch-ability is provided for the male dog's anatomy. The lining of the integrated internal support 59 may be constructed with a soft compressible polyester fleece padding material for soft padding on the interior surfaces for the dog's comfort. The dog's hind limbs may extend out through the access point 55 and a stiff, rigid, padded rounded edge 57 is provided to allow unrestricted movement into and out of the harness.

Figure 11:
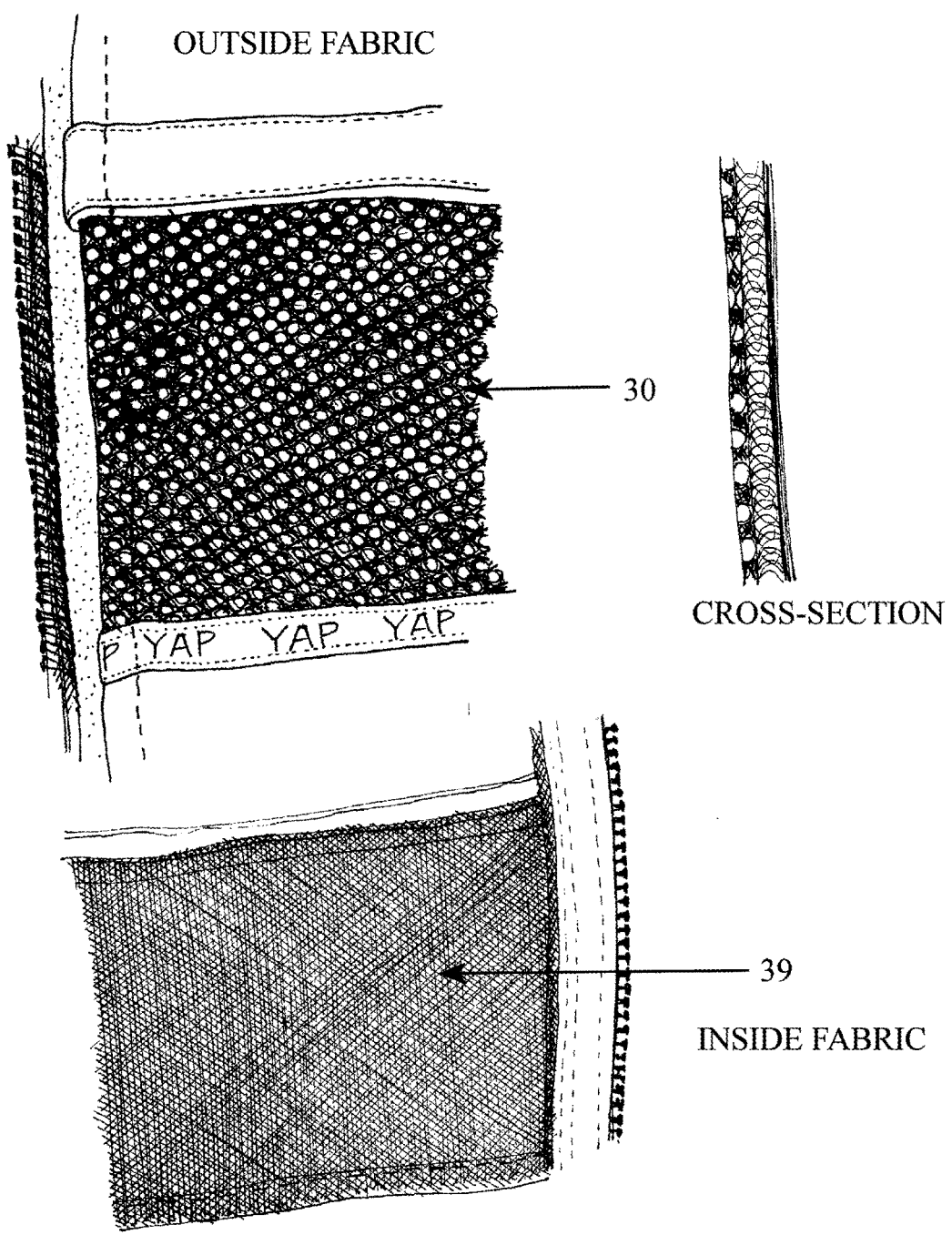
FIG. 11 is a detailed view of the breathable mesh material of the personal dog carrier harness system and showing detail of the OUTSIDE FABRIC, INSIDE FABRIC, and a CROSS-SECTION view.
Figure 12:
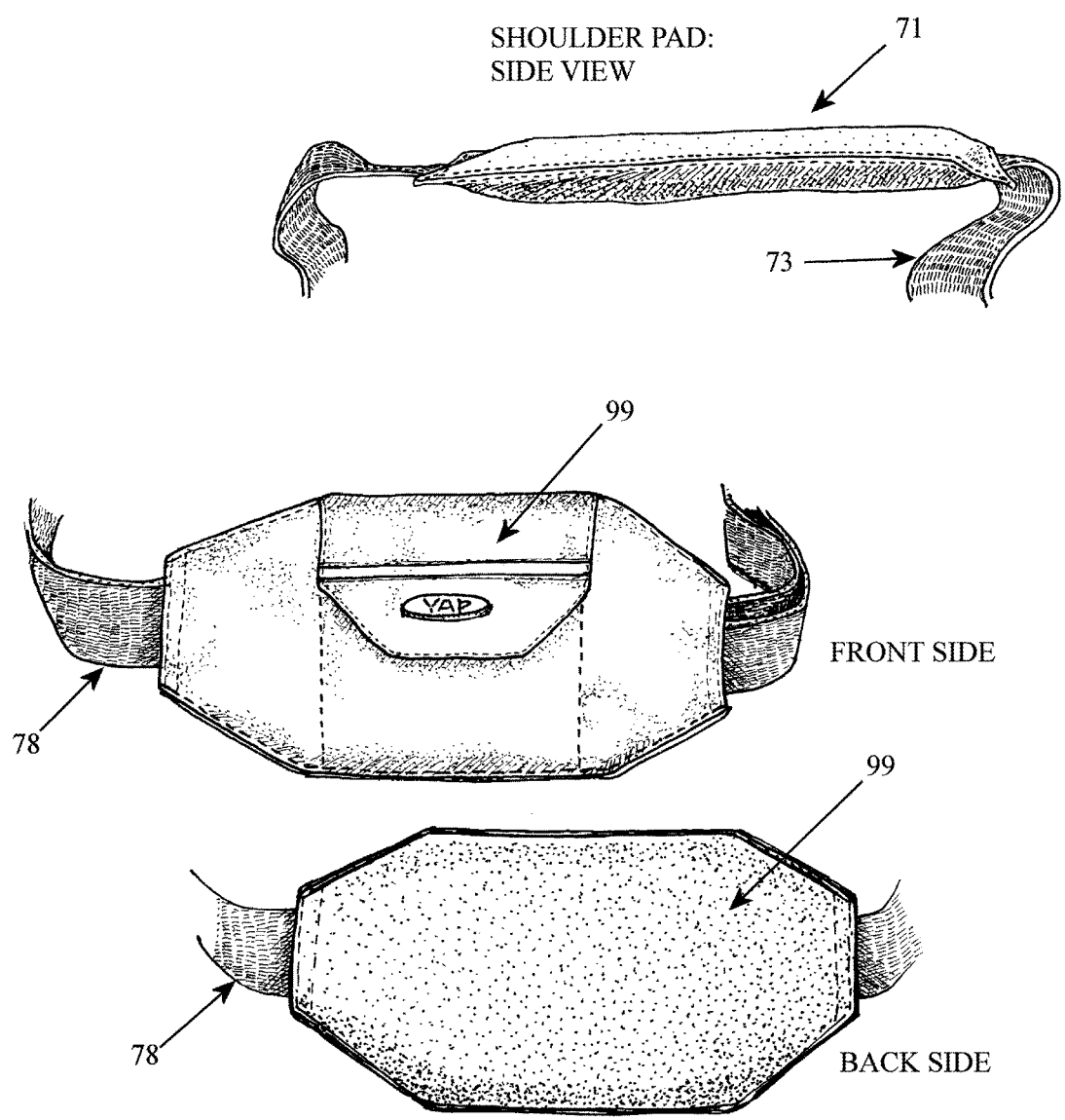
FIG. 12 is a detailed view of the padded shoulder pads, i.e., SHOULDER PAD SIDE VIEW and support straps and lumbar support strap with a FRONT SIDE and BACK SIDE view of the integrated pocket pouch for personal items.

FIG. 11 is a detailed view of the breathable mesh material 30 of the personal dog carrier harness system. Detail is also shown of the inside fabric material 39 and a cross-section view of the fabric. FIG. 12 is a detailed view of the padded shoulder support pads 71 and nylon webbing strap 73. The waist and lumbar support 78 is shown with the integrated pocket pouch 99 for personal items, dog treats, keys, wallet, or cellphone.

The invention claimed is:

1. A personal dog carrier harness system with integrated internal support and padded neck support for carrying a dog while attached to the owner's chest or back comprising:
    an internal support seat for the dog's rear end, hind limbs, crotch, and tail area with room for the male dog's anatomy;
    a padded chin rest neck support for full head and neck support and even weight distribution for the dog;
    a double-layer zipper mechanism for side entry points of the harness with flaps over side zippers which protect against injury and eliminate the accidental catching of the dog's hair or skin in the zippers;
    a stiff rigid rounded padded edge structure at harness openings to provide unrestricted movement for the dog's limbs and allow the dog to comfortably push out and pull in their arms and legs without interference from the harness;
    a three position vertical adjustment front opening mechanism which allows up to 2½ inches of adjustment up or down with an adjustable elastic top strap secured by a hook and loop fastener and buttons for providing access to the dog, for adapting to dogs with longer or shorter neck sizes, and to provide the dog with visibility;
    an upper left and right side shoulder strap webbing;
    a lower left and right side shoulder strap webbing; and
    a left and right side waist and lumbar support strap webbing;
    wherein the harness system provides eight points of weight distribution at the upper left and right side shoulder strap webbing, the lower left and right side shoulder strap webbing, the left and right side waist and lumbar support strap webbing, the internal support seat, and the padded chin rest neck support; and
    wherein the shoulder strap webbing and waist and lumbar support strap webbing evenly distribute the weight and provide full-lumbar support and full-back support for the owner and allow the dog harness system to be reversible wherein the dog may be supported at the owner's chest or on the owner's back.

2. The personal dog carrier harness system of claim 1, wherein the internal support seat is lined with a soft compressible polyester fleece padding material to evenly and comfortably support the dog's weight at the rear end, tail, crotch, and hind limbs.

3. The personal dog carrier harness system of claim 1, wherein the padded chin rest neck support is detachable from the harness with hook and loop fastener.

4. The personal dog carrier harness system of claim 1, wherein the harness exterior, shoulder pads and pocket pouch are constructed from canvas, wherein the harness interior is constructed from polyester fleece, wherein the front, middle, left side, and right side of the harness system is constructed from nylon fabric, or breathable mesh, wherein the harness straps may be constructed with leather, nylon webbing straps, steel zippers, nylon plastic buckles, nylon plastic clips, hook and loop fastener connections, and steel or plastic buttons.

5. The personal dog carrier harness system of claim 1, wherein the harness provides a safety leash and clip for attaching to the dog's collar or other existing harness worn by the dog to prevent the dog from jumping or falling out of the harness system.

6. A personal dog carrier harness system with integrated internal support and padded neck support for carrying a dog while attached to the owner's chest or back comprising:
    an internal support seat for the dog's rear end, hind limbs, crotch, and tail area with room for the male dog's anatomy;
    a padded chin rest neck support for full head and neck support and even weight distribution for the dog;
    a double-layer zipper mechanism for side entry points of the harness with flaps over side zippers which protect against injury and eliminate the accidental catching of the dog's hair or skin in the zippers;
    a stiff rigid rounded padded edge structure at harness openings to provide unrestricted movement for the dog's limbs and allow the dog to comfortably push out and pull in their arms and legs without interference from the harness;
    a three position vertical adjustment front opening mechanism which allows up to 2½ inches of adjustment up or down with an adjustable elastic top strap secured by a hook and loop fastener and buttons for providing access to the dog, for adapting to dogs with longer or shorter neck sizes, and to provide the dog with visibility;
    an upper left and right side shoulder strap webbing;
    a lower left and right side shoulder strap webbing; and
    a left and right side waist and lumbar support strap webbing;
    wherein the shoulder, waist, and lumbar support strap webbings, internal support seat, and padded chin rest neck support evenly distribute the dog's weight and provide full lumbar support and full-back support for the owner and allow the dog harness system to be reversible wherein the dog may be supported at the owner's chest or on the owner's back.

7. The personal dog carrier harness system of claim 6, wherein the harness system provides eight points of weight distribution at the upper left and right side shoulder strap webbing, the lower left and right side shoulder strap webbing, the left and right side waist and lumbar support strap webbing, the internal support seat and the padded chin rest neck support.

8. The personal dog carrier harness system of claim 6, wherein the internal support seat is lined with a soft compressible polyester fleece padding material to evenly and comfortably support the dog's weight at the rear end, tail, crotch, and hind limbs.

9. The personal dog carrier harness system of claim 6, wherein the padded chin rest neck support is detachable from the harness with hook and loop fastener.

10. The personal dog carrier harness system of claim 6, wherein the harness exterior, shoulder pads and pocket pouch are constructed from canvas, wherein the harness interior is constructed from polyester fleece, wherein the front, middle, left side, and right side of the harness system is constructed from nylon fabric, or breathable mesh, wherein the harness straps may be constructed with leather, nylon webbing straps, steel zippers, nylon plastic buckles, nylon plastic clips, hook and loop fastener connections, and steel or plastic buttons.

11. The personal dog carrier harness system of claim 6, wherein the harness provides a safety leash and clip for attaching to the dog's collar or other existing harness worn by the dog to prevent the dog from jumping or falling out of the harness system.

12. A personal dog carrier harness system with integrated internal support and padded neck support for transporting dogs while attached to the owner's chest or back comprising:

an internal support seat for the dog's rear end, hind limbs, crotch, and tail area with room for the male dog's anatomy;

a padded chin rest neck support for full head and neck support and even weight distribution for the dog;

a double-layer zipper mechanism for side entry points of the harness with flaps over side zippers which protect against injury and eliminate the accidental catching of the dog's hair or skin in the zippers;

a stiff rigid rounded padded edge structure at harness openings to provide unrestricted movement for the dog's limbs and allow the dog to comfortably push out and pull in their arms and legs without interference from the harness;

a three position adjustable top band system which allows up to 2½ inches of adjustment up or down with an adjustable elastic top strap secured by a hook and loop fastener and buttons and front opening for providing access to the dog, for adapting to taller, shorter or various sized dogs and to provide the dog with visibility; and a plurality of webbing support straps to evenly distribute the weight on the dog owner;

wherein the plurality of webbing support straps support the dog carrier harness system at the owner's shoulders, back, lumbar and waist.

13. The personal dog carrier harness system of claim 12, wherein the harness system provides eight points of weight distribution the plurality of webbing support straps, the internal support seat and the padded chin rest neck support.

14. The personal dog carrier harness system of claim 12, wherein the internal support seat is lined with a soft compressible polyester fleece padding material to evenly and comfortably support the dog's weight at the rear end, tail, crotch, and hind limbs.

15. The personal dog carrier harness system of claim 12, wherein the padded chin rest neck support is detachable from the harness with hook and loop fastener.

16. The personal dog carrier harness system of claim 12, wherein the harness exterior, shoulder pads and pocket pouch are constructed from canvas, wherein the harness interior is constructed from polyester fleece, wherein the front, middle, left side, and right side of the harness system is constructed from nylon fabric, or breathable mesh, wherein the harness straps may be constructed with leather, nylon webbing straps, steel zippers, nylon plastic buckles, nylon plastic clips, hook and loop fastener connections, and steel or plastic buttons.

17. The personal dog carrier harness system of claim 12, wherein the harness provides a safety leash and clip for attaching to the dog's collar or other existing harness worn by the dog to prevent the dog from jumping or falling out of the harness system.

\* \* \* \* \*